UNITED STATES PATENT OFFICE.

ALONZO D. PHILLIPS, OF SPRINGFIELD, MASSACHUSETTS.

MANUFACTURE OF FRICTION-MATCHES.

Specification of Letters Patent No. 68, dated October 24, 1836.

*To all whom it may concern:*

Be it known that I, ALONZO D. PHILLIPS, of Springfield, in the county of Hampden and State of Massachusetts, have invented certain new and useful Improvements in Modes of Manufacturing Friction-Matches for the Instantaneous Production of Light, which improvements consist in a new composition of matter for producing ignition and in a new mode of putting up the matches for use by which the danger of ignition from accidental friction or from other causes is obviated; and I do hereby declare that the following is a full and exact description thereof.

The composition used in preparing the matches usually called loco foco and which light by slight friction, is a compound of phosphorus, chlorate of potash, sulfuret of antimony, and gum arabic or glue. That which I use consists simply of phosphorus, chalk, and glue and in preparing it I use the ingredients in the following manner and proportions: I take one ounce of glue and dissolve it by the aid of water and heat in the usual manner; to this glue I add four ounces of finely-pulverized chalk or Spanish white, stirring it in so as to form a thick paste. I then put in one ounce of phosphorus, keeping the materials at such degree of heat as will suffice to melt the phosphorus and incorporate the whole together. Into this composition the matches are dipped after being previously dipped in sulfur in the usual manner.

The composition may be varied in its proportions, but those I have given I consider the best. The ingredients also may be varied, as gum arabic or other gum may be substituted for glue and other absorbent, earths, or materials may be used instead of the carbonate of lime.

In order to prevent the danger from accidental ignition I prepare the pine wood for my matches in the following manner: I cut my pine into thin slabs about the usual thickness of veneers. These I cross cut into lengths for matches and by means of gangs of circular saws cut these comb fashion and lengthwise of the grain of the wood, leaving a portion at one end uncut holding the strips together like the back of a comb. The number of matches on each slab may be about a dozen. These are then dipped in the sulfur and afterward in the above named composition and put up for sale by laying the slabs upon long slips of paper, cut wide enough to lap over the ends of the matches. The slabs are then doubled up in the paper, much in the manner of papering pins. A slab when wanted, may be taken out without disturbing the remainder and the paper effectually removes all danger from friction.

What I claim as my invention is—

The use of a paste or composition to ignite by friction, consisting of phosphorus and earthy material and a glutinous substance only without the addition of chlorate of potash or of any highly combustible material such as sulfuret of antimony in addition to the phosphorus. I also claim the mode herein described of putting up the matches in paper so as to secure them from accidental friction.

ALONZO D. PHILLIPS.

Witnesses:
THOS. P. JONES,
HENRY WILSON.